United States Patent [19]

Brett et al.

[11] 4,210,427
[45] Jul. 1, 1980

[54] METHOD AND APPARATUS FOR CLEANING GAS

[76] Inventors: David P. Brett; Christopher J. Walker, both of 3 Patern St., Highton, Geelong, Victoria, 3216, Australia

[21] Appl. No.: 731,798

[22] Filed: Oct. 12, 1976

[30] Foreign Application Priority Data

Oct. 10, 1975 [AU] Australia .............................. PC3523

[51] Int. Cl.² ...................... B01D 46/30; B01D 29/08; B01D 46/04
[52] U.S. Cl. ......................................... 55/96; 55/294; 55/474
[58] Field of Search .................. 55/282, 302, 345, 337, 55/349, 291, 430, 432, 96, 350, 294, 474; 210/275

[56] References Cited

U.S. PATENT DOCUMENTS

| Re. 28,396 | 4/1975 | Berz et al. | 55/302 |
| 461,801 | 10/1891 | Radkey | 55/349 |
| 3,564,570 | 3/1968 | Lincoln et al. | 55/302 |
| 3,917,472 | 11/1975 | Berz | 55/349 |

FOREIGN PATENT DOCUMENTS

| 738349 | 8/1943 | Fed. Rep. of Germany | 55/294 |
| 2293962 | 7/1976 | France | 55/291 |
| 44-20715 | 8/1969 | Japan | 55/346 |
| 217580 | 8/1968 | U.S.S.R. | 55/345 |
| 343701 | 10/1970 | U.S.S.R. | 55/349 |
| 453175 | 1/1975 | U.S.S.R. | 55/459 |

Primary Examiner—Frank W. Lutter
Assistant Examiner—Gregory N. Clements
Attorney, Agent, or Firm—Murray and Whisenhunt

[57] ABSTRACT

The present invention provides a method of cleaning a filter bed for filtering gas, the bed being comprised of particulate material, the method comprising passing a gas stream through the filter bed from below which being counter current to the direction of flow through the filter bed during filtering, and disturbing at least the upper surface of the bed with a gas stream issuing from a nozzle located above the bed.

The present invention also provides apparatus for filtering comprising a support for a filter bed of particulate material, means adapted in use to pass a gas stream through the filter bed from below which being counter current to the direction of flow through the filter bed during filtering and a nozzle located above the bed adapted in use to direct a gas stream to disturb at least the upper surface of the filter bed.

The present invention also provides gas cleaning apparatus comprising two cyclones having their axes inclined to and on opposite sides of an imaginary vertical plane and having their particle outlets positioned to deliver to a common conveyor.

8 Claims, 5 Drawing Figures

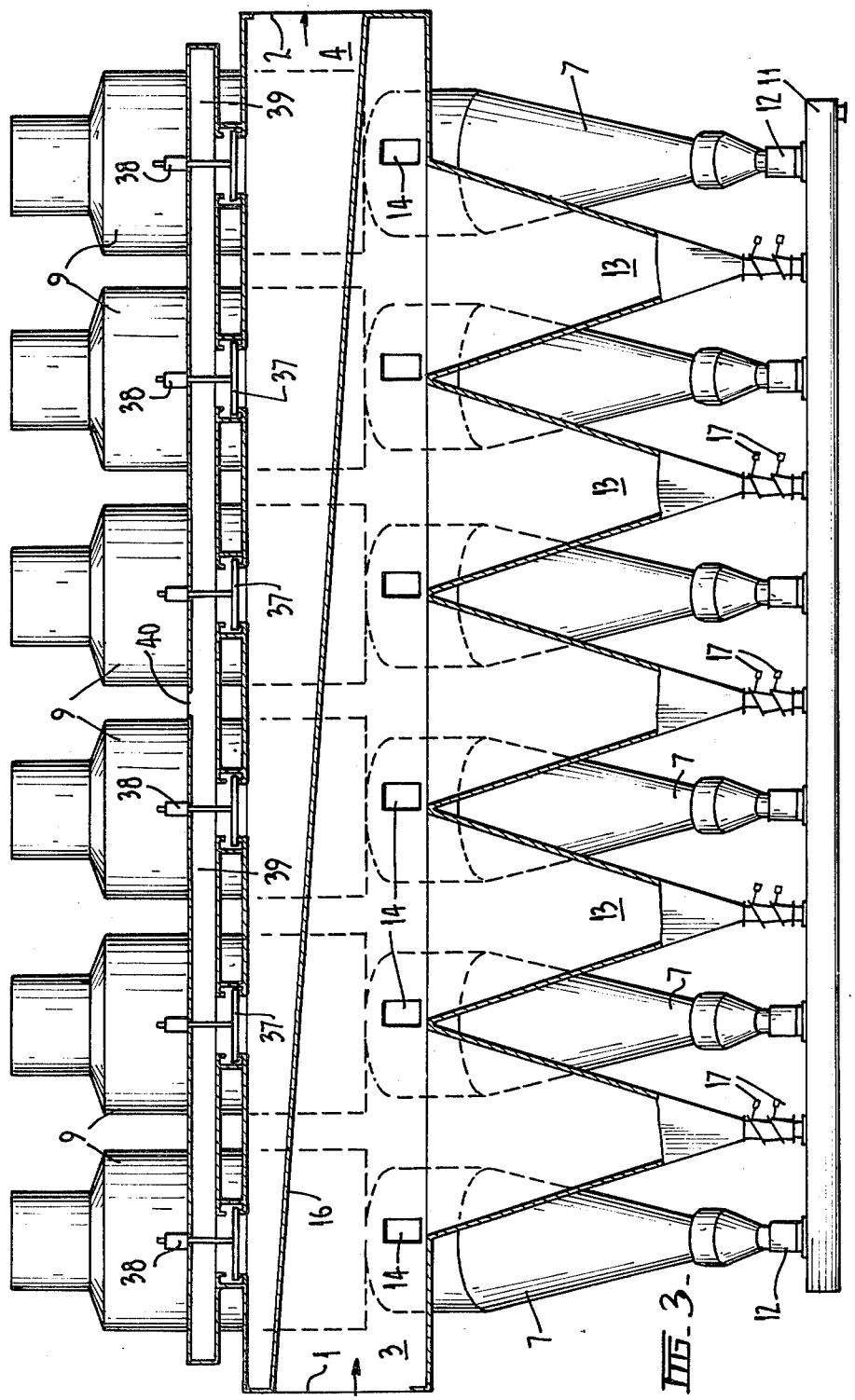

METHOD AND APPARATUS FOR CLEANING GAS

BACKGROUND OF THE INVENTION

1. Field of the Invention

This invention relates to method and apparatus for cleaning gas.

In partciular aspects this invention relates to screw conveyors, cyclones, filters, gravel bed filters and cleaning gas streams.

2. Description of the Prior Art

Reference is made to U.S. Pat. Nos. 3,594,991 and 3,917,472 and to U.S. Pat. No. Re. 28396.

In those U.S. specifications is disclosed, inter alia, a gravel bed filter which is cleaned by passing a gas stream through the filter from below (which being counter current to the direction of flow during filtering). Further, the upper surface of a gravel filter bed is disturbed, during the cleaning operation, by a rake which is moved through the filter bed. In one instance air is passed down the inside of the tines of the rake into the filter bed.

Applicant has found that considerable power is required to drive the rake through the filter bed and in particular that the power requirements are at a maximum on commencing movement of the rake at the beginning of a cleaning operation as the rake must accelerate from a stationary condition and at that time the gravel bed tends to be clogged with residue from fileterring which will restrict movement of the rake. Later in the cleaning operation when the rake has been accelerated and after a majority of the residue has been removed this is less of a problem but the major difficulty of initial movement of the rake at the commencement of a cleaning operation remains.

In addition to the power requirement required to initiate movement of the rake as compared to the power requirement to move the rake later in the cleaning operation it has also been observed by applicant that damage to the tines of the rake may occur; particularly at initiation of movement of the rake. This damage includes bending or even breaking of the tines. Further, the tines are normally supported on an arm which is in turn supported by a shaft which is supported in bearings and applicant has found that damage to the arm, shaft or bearings can occur. Damage to the shaft or bearings can be particularly serious as it may hamper rotation of the shaft and/or put undue strain on a motor for rotating the shaft.

SUMMARY OF THE INVENTION

The present invention provides in one aspect, a method of cleaning a filter bed for filering gas, the bed being comprised of particulate material, the method comprising passing a gas stream through the filter bed from below which being counter to the direction of flow through the filter bed during filtering, and disturbing at least the upper surface of the bed with a gas stream issuing from a nozzle located above the bed. p
This invention also provides apparatus for filtering comprising a support for a filter bed of particulate material, means adapted in use to pass a gas stream through the filter bed from below which being counter current to the direction of flow through the filter bed during filtering and a nozzle located above the bed adapted in use to direct a gas stream to disturb at least the upper surface of the filter bed.

Using a nozzle located above the bed has been found to produce quite adequate cleaning at a power input substantially less than the aforementioned rake. Further, even if the same or greater power is used to produce the gas stream existing from the nozzle as is used in respect of the rake, the power requirement at commencement of the cleaning operation as compared to the end of the cleaning operation is not as different as in respect of the rake. Still further, the likelihood of damage to the nozzle or means mounting same is remote.

PREFERRED ASPECTS OF THE INVENTION

In a particularly preferred instance gas is passed through the nozzle and the nozzle is moved over the filter bed to disturb the upper surface thereof.

Accordingly, this invention also provides filter bed cleaning apparatus comprising a nozzle through which, in use, a gas stream is passed and means for moving the nozzle over a surface of a filter bed comprised of particulate material to disturb that surface.

The gas stream which is used to disturb the filter bed is preferably directed thereat at a pressure of from 30 to 100 psig with 40 to 60 psig being most preferred.

In a particularly preferred instance a number of nozzles are mounted on an arm which is rotated above the filter bed. The nozzles may be so directed as to cause the arm to so rotate.

However, since the nozzles may produce furrows in the upper surface of the bed and, since this is undesirable, it is preferred that towards the end of the filter bed cleaning cycle the method is conducted in such a way as to smooth out the upper surface of the filter bed. This may be done by using such a gas pressure as is necessary to fluidize the upper surface of the filter bed and the rapidly discontinuing fluidizing so that the fluidized particulate material falls to make a smooth surface. Alternatively or additionally, the nozzles may be raised with respect to the upper surface and this, by producing broader air streams, will tend to smooth out furrows. Alternatively or additionally, the nozzles may be moved rapidly over the surface and this too will tend to smooth out furrows. Alternatively or additionally, the nozzles may be supplied from a chamber which is itself supplied by a compressor outputing less gas than the nozzles will output and thus, over a period of time there will be a gradual drop in pressure and flow through the nozzles.

In another aspect this invention provides gas cleaning apparatus comprising two cyclones having their axes inclined to and on opposite sides of an imaginary vertical plane and having their particle outlets positioned to deliver to a common conveyor.

It is preferred that the conveyor is capable of moving in said plane and preferably generally horizontally.

In a preferred aspect of this the two cyclones have their axes in another imaginary vertical plane perpendicular to the first mentioned plane.

In another preferred aspect this invention provides gas cleaning apparatus comprising two rows of cyclones respectively disposed on opposite sides of a first imaginary vertical plane, with cyclones in one row adjacent to cyclones in the other row having their axes lying in respective second imaginary vertical planes perpendicular to the first mentioned plane and with their axes inclined to said first mentioned plane and outwardly upwardly diverging and further including a common conveyor to which the particle outlets of the cyclones deliver in use.

The conveyor is preferably a screw conveyor.

An inlet chamber for the cyclones is preferably positioned between them. As particles may be deposited in the inlet chamber it is preferred that it has an outlet therefor and it is preferred that the outlet feeds to the common conveyor.

A construction of gas cleaning apparatus in accordance with this invention will now be described with the aid of the accompanying drawings.

DESCRIPTION OF THE VIEW OF THE DRAWINGS

FIG. 3 is a cross-section approximately on line III—III in FIG. 2,

DETAILED DESCRIPTION

Figure 1:
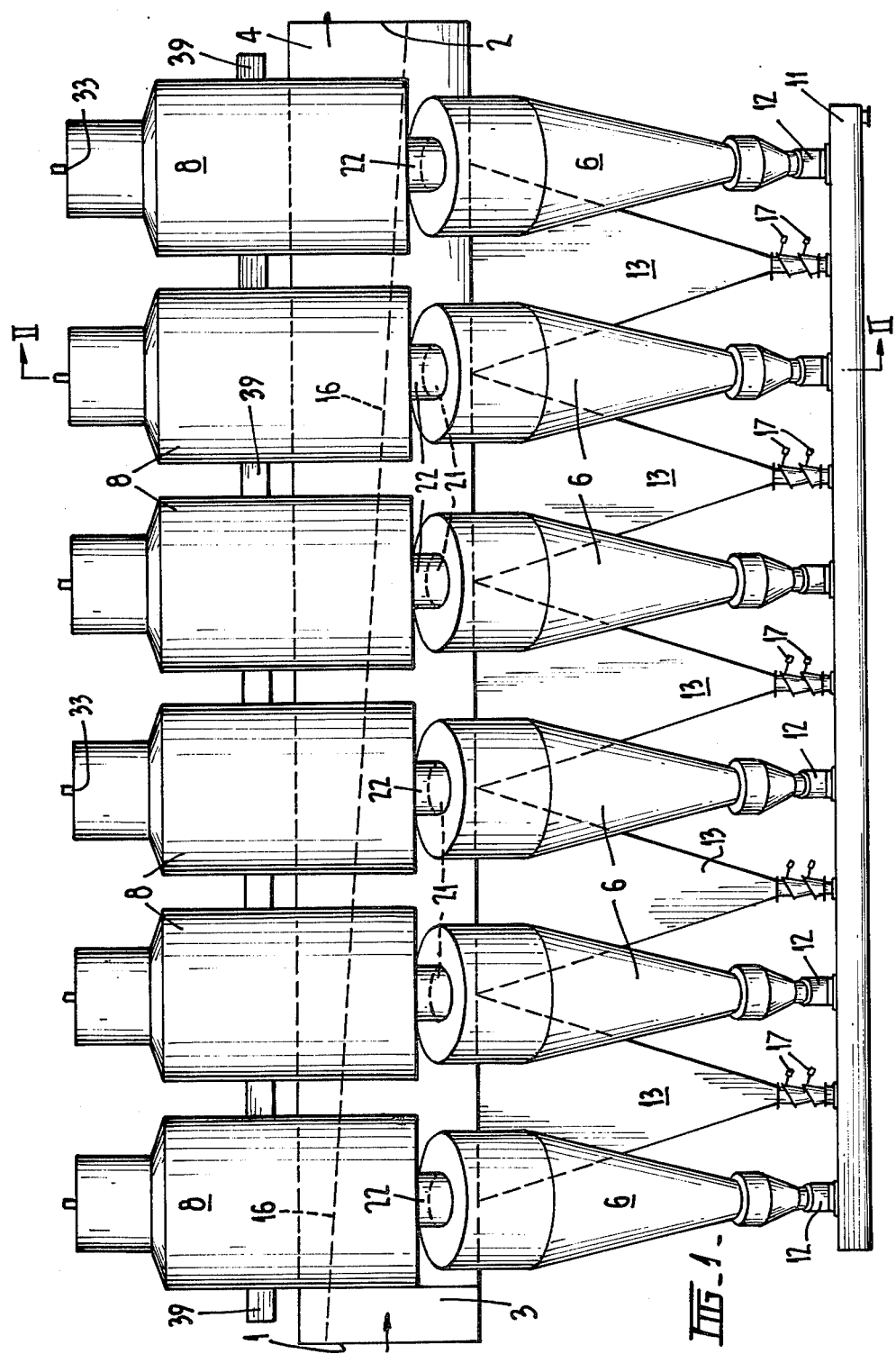
FIG. 1 is a side elevation of the apparatus.

The drawings show gas cleaning apparatus comprising a dirty gas inlet 1, a clean gas outlet 2, a dirty gas manifold 3, a clean gas manifold 4, a first bank of cyclones 6, a second bank of cyclones 7, a first bank of gravel bed filters 8, a second bank of gravel bed filters 9 and a common screw conveyor 11.

It will be observed that the axes of cyclones 6 and 7 are not parallel to one another but are inclined so that their particle outlets 12 feed to the common conveyor. Similarly, outlets 13 from the dirty gas manifold 3 feed to the common conveyor 11.

In consequence of the inclination of the axes of the cyclones and the location of the dirty gas manifold 3 between the banks of cyclones only one screw conveyor is used as compared to a known construction in which a screw conveyor is used for each bank of cyclones (which cyclones having their axes extending vertically) and a third conveyor is connected to the equivalent of outlet 13.

The dirty gas manifold 3 has the aforesaid inlet 1 and a plurality of outlets 14. The dirty gas manifold 3 is separated from the clean gas manifold 4 by a wall 16 and it is to be observed that that wall is inclined so as to, respectively, reduce and increase the cross-section of the dirty gas and clean gas manifolds 3 and 4 along their lengths.

The dirty manifold 3 also has the aforesaid outlets 13 to which particles deposited in the manifold 3 fall. The outlets 13 are provided with weight operated flap valves 17 which will open when a predetermined weight of particles is thereabove to let the particles fall to the conveyor 11 and which will thereafter close.

The outlets 14 of the manifold 3 communicate with inlets 18 of the cyclones and dirty gas passes into the cyclones as is shown by arrow 19.

In the cyclones particles are deposited and fall to weight operated flap valves in the bottom of the cyclones and from there can pass to the conveyor 11.

Gas passes out of the cyclones via outlets 21 to the gravel bed filers.

Two gravel bed filters are mounted above each cyclone and each comprises a gas inlet. The lower of each two filters has an inlet 22 which communicates with the outlet 21 and the upper of each two filters has an inlet 23 which communicates with a chamber 24 above the lower of each two filters.

Each gravel bed filter comprises a support 26, a gravel bed 27 and an outlet 28. The outlets 28 communicate with inlets 29 to the clean gas manifold 4.

In use of the apparatus to clean gas, dirty gas enters the inlet 1 and passes into manifold 3. Flow of firty gas may be achieved by blowing the dirty gas or by applying suction at the clean gas outlet 2. In manifold 3 some particles separate and pass to conveyor 11. Gas from manifold 3 passes to one of the cyclones and there more particles separate out and are passed to the conveyor 11. Gas from the cyclones passes to and through the gravel bed filters from above where further particles separate out and from there to the clean gas manifold 4 and out via the outlet 2. The above is, generally, the gas cleaning cycle.

The gravel bed filters also include a housing or the top thereof which contains a motor 31 drive 32 which is capable of rotating pipe 33. The pipe is supplied with compressed gas when it is desired to backwash the gravel bed filters. Extending from the pipe 33 is an arm 34 for each filter and the arms 34 terminate in manifolds 36 which have a plurality of gas exit nozzles (not shown).

Mounted on the upper surface of the clean gas manifold 4 is a number of valves 37 and operators therefor 38.

Figures 2, 5:
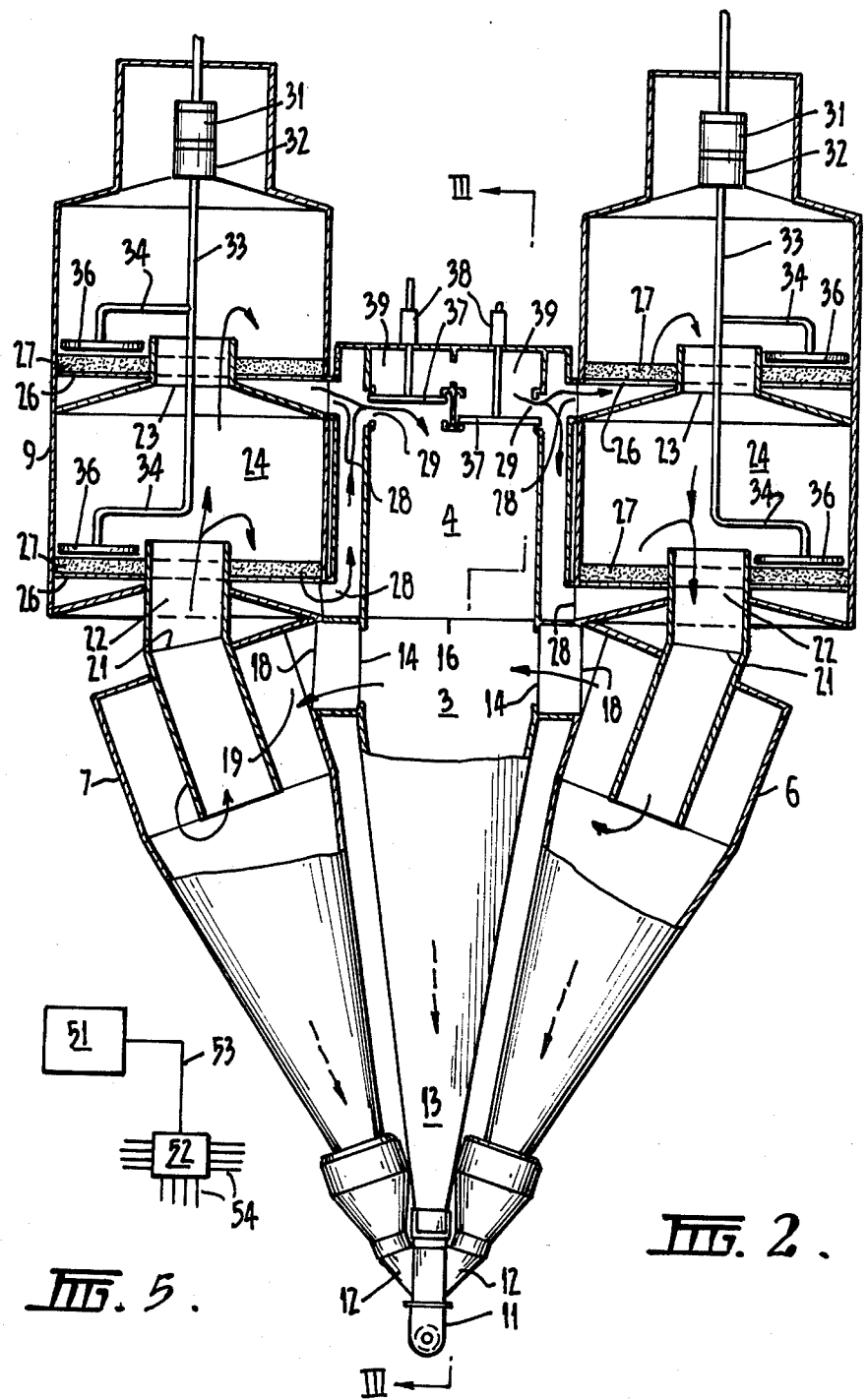
FIG. 2 is a cross-section approximately on line II—II in FIG. 1.
FIG. 5 is a schematic view of part of the apparatus.
Figure 4:
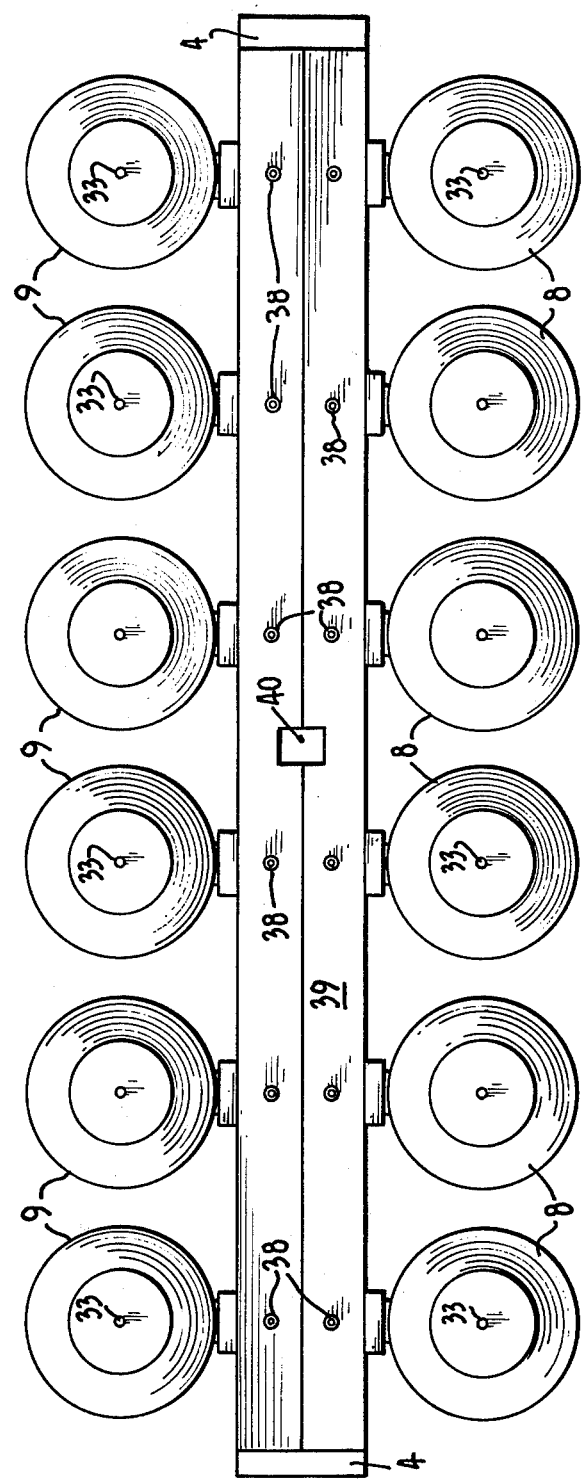
FIG. 4 is a plan view of the apparatus.

The valves 37 are each locatable in one of two positions, a first position, which is shown on the left in FIG. 2, in which inlets 29 are open to the manifold 4 and in which inlets 29 are not open to chamber 39, a second position, which is shown on the right in FIG. 2, in which inlets 29 are open to chamber 39 but not open to manifold 4.

When it is desired to backwash any two superimposed gravel bed filters the valve 37 in respect thereof is moved from said first position, which is the position that the valve is normally in when gas is being cleaned in those gravel bed filters, to said second position and clean air from an outside source, and delivered by a backwash fan of power appropriate to backwashing, is passed into inlet 40 of chamber 39 and then in the direction of the arrows on the right in FIG. 2 (the opposite direction to the arrows on the left in FIG. 2), through the gravel bed filters to be backwashed, into their associated cyclone and then into the dirty gas manifold 3.

At the same time the pipe 33 is rotated and compressed gas is supplied to the nozzle. The gas existing from the nozzles will disturb the surface of the gravel beds 27 so that particles deposited thereon will be removed.

Particles which are backwashed will tend to separate out in the associated cyclone or in the manifold 3 but some will be collected by another one of the gravel bed filters.

The backwashing of each two superimposed gravel bed filters may be done at predetermined intervals, irregularly or in response to criteria but in a system using 12 cyclones and 24 gravel bed filters it will be usual for two superimposed gravel bed filters to be backwashed at any one time.

One apparatus for supplying compressed gas to the pipe 33 is shown in FIG. 5 and comprises a compressor 51 which is connected to a valve 52 by a line 53. The valve 53 has further lines 54 connected thereto (one for each pipe 33) and by selectively operating the valve 53 compressed gas may be supplied to a selected one of the pipes 33. In this instance the compressor 51 is capable of selectively delivering compressed gas at a rate which will disturb or fluidize the gravel beds.

The apparatus of the present invention is economical in that it uses only one screw conveyor and in that the motors 31 do not require to be of high power. At the same time the apparatus is effective in cleaning gas and also in cleaning the gravel bed filters in backwashing.

The gravel beds will usually contain 6 to 8 Tyler mesh filter medium. The gas from the nozzles will usually be supplied at 30 to 100 psc. Backwashing will usually be performed for 3 to 5 minutes. The backwash gas pressure in chamber 39 will usually be 6" waterguage or less.

The apparatus of this invention is particularly useful in agglomerating dust; particularly dust at temperatures of above 500° F. Illustrative uses are for kiln exhausts such as in the cement and lime industries and for trapping fly ash from power generating stations.

Modifications and adaptations may be made to the above described without departing from the spirit and scope of this invention which includes every novel feature and combination of features disclosed herein.

We claim:

1. A method of cleaning a filter bed of particulate material for filtering gas, wherein the gas to be filtered is passed in the form of a third gas stream through said bed in a downward direction, said method comprising passing a first gas stream upwardly through the filter bed from below in the substantial absence of said third gas stream and in a direction of flow which is counter current to the flow of said third gas stream through the filter bed during filtering, while disturbing at least the upper surface of the filter bed with a second gas stream issuing downwardly from a nozzle located outside of and above the filter bed.

2. A method as claimed in claim 1, wherein the second gas stream is moved over the filter bed to disturb the upper surface thereof.

3. Method of claim 1, wherein the second gas stream which is used to disturb the upper surface of the filter bed is directed downwardly at the upper surface of the filter bed at a pressure of from 30 to 100 psig.

4. In an apparatus for filtering gas comprising a supported filter bed of particulate material, gas inlet means to pass the gas to be filtered downward through the filter bed, gas outlet means, and means to pass a first cleaning gas stream upwards through the filter bed from below to clean the filter bed in the absence of said gas to be filtered, the improvement comprising nozzle means located outside of and above the filter bed for directing a second cleaning gas stream upon the filter bed to disturb at least the upper surface of the filter bed during filter bed cleaning.

5. An apparatus as claimed in claim 4, additionally including a means for moving said nozzle means over said filter bed.

6. An apparatus as claimed in claim 5, additionally including an arm, a gas manifold mounted on said arm, a plurality of nozzles mounted on said manifold, and rotating means for rotating said arm above said filter bed.

7. An apparatus as claimed in claim 4, including a compressor means in fluid communication with said nozzle means for delivering said second gas stream to disturb the upper surface of the filter bed at a sufficient pressure to fluidize the bed.

8. Apparatus for filtering gas, comprising a filter bed of particulate material, a gas-permeable support for said filter bed, first gas supply means for passing a gas stream to be filtered downward through said filter bed, means to remove said gas stream from said apparatus, second gas supply means to pass a cleaning gas stream upwards through said filter bed from below to clean the filter bed, said second gas supply means passing gas through said filter bed in the opposite direction of flow than gas passing through said filter bed from said first gas supply means, valve means for controlling said first gas supply means and second gas supply means so that only one of said gas supply means is passing gas through the filter bed at a given time, and third gas supply nozzle means located outside of and above said filter bed for directing a gas stream downward upon the filter bed to disturb at least the upper surface of the filter bed during at least a portion of the cleaning thereof.

* * * * *